Patented Jan. 9, 1951

2,537,018

UNITED STATES PATENT OFFICE 2,537,018

COPOLYMER AND COATING COMPOSITION

Gerald R. Barrett, Winchester, Mass., assignor to Monsanto Chemical Company, St. Louis, Mo., a corporation of Delaware No Drawing. Application May 29, 1948,
Serial No. 30,216

27 Claims. (Cl. 260—17)

The present invention relates to new polymerization products and more particularly to products formed by the reaction or copolymerization of combinations of polymerizable vinyl compounds having the structural formula

R—CH=CH$_2$ where R is a phenyl radical, which may or may not be substituted, with mono-functional secondary alkly half esters of ethylene $\alpha,\beta$-dicarboxylic acids alone or in the presence of other materials.

The present invention also relates to coating compositions comprising as an essential film-forming material a copolymer of secondary alkyl half esters of ethylene $\alpha,\beta$-dicarboxylic acids with a polymerizable vinyl compound having the general formula R—CH=CH$_2$, where R is a phenyl or substituted phenyl radical.

An object of the present invention is to provide new polymerization products.

It is a further object of the invention to provide coating compositions which dry quickly to hard, yet flexible, films possessing good adhesion to non-flexible surfaces.

A further object of the invention is to provide coating compositions which have excellent solvent release characteristics and which dry quickly after application to yield a film possessing excellent sanding properties.

A further object of the invention is to provide coating compositions which are especially adapted as sanding sealers for wood.

Still further objects and advantages of the invention will appear from the following description and the appended claims.

The coating compositions of the present invention comprise as an essential film-forming material a copolymer of a secondary alkyl half ester of an ethylene $\alpha,\beta$-dicarboxylic acid, wherein the secondary alkyl group contains from 4 to 12, and preferably from 6 to 10 carbon atoms, with a polymerizable vinyl compound having the general formula R—CH=CH$_2$, where R is a phenyl group or a substituted phenyl group. As examples of secondary alkyl acid esters of ethylene $\alpha,\beta$-dicarboxylic acids which are suitable for use in the preparation of such copolymers may be mentioned sec-butyl acid maleate, methyl isobutyl carbinyl acid maleate, methyl amyl carbinyl acid maleate, methyl hexyl carbinyl acid maleate, methyl heptyl carbinyl acid maleate, methyl decyl carbinyl acid maleate and the like and the corresponding acid fumarates. The invention is particularly directed to the use of copolymers prepared from styrene and those secondary alkyl acid maleates which contain from 6 through 10 carbon atoms in the alkyl group, or mixtures of such maleates.

As monomers which are copolymerized with the above described secondary half esters or acid esters of ethylene $\alpha,\beta$-dicarboxylic acids for use in the coating compositions of the invention may be mentioned styrene, methyl styrene, dimethyl styrene, chloro-styrene, dichloro-styrene and the like. With the exception of styrene, the latter are all nuclear substituted. Generally, the secondary half esters of ethylene $\alpha,\beta$-dicarboxylic acids are copolymerized with such polymerizable vinyl compounds in a molal ratio of about 1:1.0 to 1:2.0 and preferably in a molal ratio of about 1:1.1 to 1:1.5.

The above described copolymers may be prepared in various ways. In general, they are prepared by first forming the alkyl acid maleate or fumarate by reacting a secondary monohydric alcohol, containing from 4 to 12 carbon atoms, with maleic acid, fumaric acid or maleic anhydride until the reaction product, which is substantially an alkyl half ester or alkyl acid ester, has a substantially constant acid value on continued heating. The secondary alcohol and acid or anhydride are generally reacted in a molal ratio of 1:1.0 to 1:1.4 although a slightly larger ratio of acid or anhydride to alcohol may be employed. It is preferable to prepare such alkyl acid ester by reacting the secondary alcohol with maleic anhydride. The reaction product as obtained above is then copolymerized in suitable manner with a polymerizable vinyl compound of the type described, preferably styrene, generally by carrying out the copolymerization reaction in the presence of a suitable catalyst as, for example, a peroxide catalyst such as benzoyl peroxide.

Various well-known polymerization methods may be employed in carrying out the formation of the copolymeric material depending upon the mutual solubility of the monomeric reactants. Thus, if the monomeric reactants are mutually soluble the mass polymerization method may be employed. In this method the reactants are in general copolymerized at temperatures between about 100° F. to 300° F. for several hours or more.

Another method which may be used to prepare such copolymeric materials is known as the solvent process which involves copolymerizing the monomeric reactants in the presence of a solvent which is capable of dissolving such monomeric reactants and the copolymerizate. The copolymer, which is precipitated after the reaction, for example, by the addition of a diluent, is then separated from the solvent and the unreacted monomers by filtration, centrifuging or the like.

Coating compositions containing appropriate quantities of the above described copolymeric materials and a suitable solvent therefor dry down rapidly to form hard, yet flexible, films which possess excellent sanding characteristics and which are particularly suitable as base coats on wood surfaces, cast metal surfaces, moulded polystyrene and the like. The films formed from such compositions are superior in sanding characteristics to those formed from shellac, nitrocellulose, alkyd resins and the like and have the added advantage of quick drying and sandability within from 15 to 60 minutes after spraying. Typical spray compositions comprise from about 8 to 28% by weight of such copolymeric materials, the remainder being a suitable organic solvent for said copolymer and, if desired, suitable coating adjuvants of the type hereinafter described. The quantity of copolymer used in such compositions depends to a certain extent on the solution viscosity of copolymer, that is, its average molecular weight, and the number of carbon atoms in the alkyl group of the alkyl acid ester which was employed in its preparation.

Solvents and solvent mixtures which may be employed in preparing such compositions include butyl acetate, ethyl acetate, diacetone alcohol, isopropyl alcohol, ethyl alcohol (also denatured alcohols), propyl alcohol, butyl alcohol, and mixtures of these solvents either with each other or with other solvents, including such mixtures as isopropyl alcohol-toluol, ethyl acetate-butanol-toluol, butanol-xylol, butanol-petroleum fractions, ethanol-toluol, ethanol-ethyl acetate-toluol and the like. By selecting a suitable solvent or mixture of solvents, compositions may be obtained which are suitable for either spraying or brushing in accordance with the common practice in the coating art.

The following example illustrates compositions consisting solely of the copolymer dissolved in a suitable solvent mixture and also sets forth the properties of films formed therefrom when applied as a base coat to wood surfaces, parts and percentages being by weight unless otherwise specified.

*Example I*

A copolymer (hereinafter referred to as copolymer A) was prepared by first reacting about 1 molecular proportion of methyl isobutyl carbinol with about 1.1 molecular proportions of maleic anhydride in a suitable reactor at a temperature of approximately 65° C. until the reaction product had a constant acid value (as determined by titration) on continued heating. The resulting mixture was then copolymerized with about 1.5 molecular proportions of styrene in the presence of about 0.002 molecular proportion of benzoyl peroxide and 0.02% of $\beta$-nitro styrene by heating the mass at a temperature of about 70° C. during the period of rapid heat evolution. The temperature of the mass was then raised to 125° C. until the reaction was completed. The viscosity of 0.3 gram of the dry copolymer in 10 grams of acetone was 0.49 cps. at 25° C. as measured with a #50 Ostwald-Cannon-Fenske pipette.

In place of $\beta$-nitro styrene, other chain-breaking copolymerization retarders may be used to cause the formation of copolymer chains of relatively low molecular weight. Such copolymers are referred to herein as low viscosity copolymers. Other methods of producing low viscosity copolymers may also be used as, for example, by employing larger quantities of catalyst during the preparation of the copolymer.

A coating composition containing the copolymer prepared as described above was prepared by mixing the following ingredients in the proportions stated.

| | Parts |
|---|---|
| Copolymer A | 15 |
| Special denatured alcohol No. 1 | 42.5 |
| Toluol | 42.5 |

This composition was sprayed on a maple surface and dried down to a non-tacky sandable film in about 30 minutes. This film does not gum up conventional sand papers. It is superior in rate of drying and sanding characteristics to conventional wood sealing coatings.

Another spray composition similar to the above was prepared which contained the following ingredients:

| | Parts |
|---|---|
| Copolymer A | 16 |
| Isopropanol (91% by volume) | 33.6 |
| Toluol | 50.4 |

This composition when sprayed on wooden surfaces dries down to a sandable film at a slightly faster rate than the above composition.

The solvents described in this example may be replaced wholly or in part with other solvents of the type hereinbefore described to obtain coatings having similar characteristics.

Compositions of the type hereinbefore described can be suitably modified to alter the characteristics of the film formed therefrom by the addition thereto of compatible plasticizers and film-forming materials. As examples of the latter may be mentioned compatible thermoplastic cellulose derivatives such as ethyl cellulose, nitrocellulose and the like and compatible natural resins which are alcohol-soluble or partially alcohol-soluble as, for example, dewaxed dammar, dewaxed shellac, Manila Copal and the like. The quantity of such film-forming materials incorporated in the above compositions may be varied considerably depending upon the characteristics desired in the film formed therefrom, but is preferably from about 5 to 75% by weight based on the copolymers or resins hereinbefore described.

As examples of compatible plasticizers which may be employed in the foregoing compositions may be mentioned di (butoxy ethyl) phthalate, glyceryl mono-oleate, diglycol monolaurate, triglycol dihexoate, nonaethylene glycol mono-oleate, tricresyl phosphate, oleic acid, dimethoxy ethyl phthalate, methyl phthalyl ethyl glycollate, glyceryl monoricinoleate and the like. In the case of wood sealing formulations of the type described, plasticizers are not required. However, plasticizers such as the foregoing are useful in compositions which are to be applied to metals, polystyrene and the like in amounts varying from about 5 to 60% by weight, based on the copolymer.

In addition to the foregoing film-forming materials and plasticizers, compositions of the invention may also comprise suitable pigments, extenders and flattening agents such as carbon black, silica aerogels, lead carbonate, lead chromate, manganese silicate, titanium dioxide and the like.

The following example illustrates coating compositions similar to those described in Example I but modified as described above, parts and percentages being by weight.

Example II

A composition was prepared which contained the following ingredients:

| | Parts |
|---|---|
| Butyl acetate | 5 |
| Isopropyl alcohol (91% by volume) | 27.6 |
| Toluol | 46.2 |
| Dibutyl phthalate | 4.0 |
| Special denatured alcohol No. 1 | 3.2 |
| Nitrocellulose (18–25 cps.) | 6.0 |
| Copolymer A (as prepared in Example I) | 8.0 |

This composition was sprayed on a clean maple surface and dried down to a sandable film in about 45 minutes. The film formed from this composition does not sand as readily or efficiently as those formed from the compositions in Example I. However, it possesses better adhesion to wood and metal surfaces.

A composition was prepared which contained the following ingredients:

| | Parts |
|---|---|
| Special denatured alcohol No. 1 | 43 |
| Toluol | 27 |
| Ethyl acetate | 15 |
| Nitrocellulose (18–25 cps.) | 3 |
| Copolymer A (as prepared in Example I) | 12 |

This composition was sprayed on a clean maple surface and it dried to a sandable film in about 1 hour. It has substantially the same sanding characteristics as the film formed from the preceding composition.

A composition was prepared which contained the following ingredients:

| | Parts |
|---|---|
| Special denatured alcohol No. 1 | 43 |
| Toluol | 26 |
| Ethyl acetate | 15 |
| Nitrocellulose (½ second) | 4 |
| Copolymer A (as prepared in Example I) | 12 |

This composition dried at substantially the same rate as the composition described immediately above. The film formed therefrom is hard, yet flexible, and possessed excellent sanding characteristics within about 1 hour after being sprayed.

The foregoing compositions may be applied as a base coat to a variety of non-flexible surfaces by various well-known techniques such as spraying, brushing and the like depending upon the base surface to which it is applied and the quantity of copolymeric resin, other film-forming materials and plasticizers present in the composition.

The quantity of copolymer employed when the coating composition is applied by spraying or brushing is in general between 8 and 28% by weight of the composition. However, when the coating is applied by dipping or other similar method, larger amounts of the copolymer may be used, if desired. In view of the fact that the viscosity of the coating composition is dependent on both the quantity of the copolymer present and its average molecular weight, it is possible to vary the amount of copolymer used by varying its molecular weight. Thus, when copolymers of low average molecular weight are employed, it is possible to use larger amounts than otherwise for any particular method of application.

The foregoing examples are intended to be illustrative of the invention and not limitative of the scope thereof.

This application is a continuation-in-part of my copending application Serial No. 719,136, filed December 28, 1946, now abandoned.

What is claimed is:

1. A coating composition comprising as an essential film-forming material a copolymer consisting of the copolymerization product of a secondary alkyl acid ester of an ethylene $\alpha,\beta$-dicarboxylic acid selected from the group consisting of maleic and fumaric acids, wherein the alkyl group contains from 6 to 10 carbon atoms, with a polymerizable vinyl compound having the general formula $R-CH=CH_2$, where R is a radical selected from the group consisting of a phenyl group, a chloro substituted phenyl group and a methyl substituted phenyl group, said dicarboxylic compound and said vinyl compound being copolymerized in a molal ratio of about 1:1.1 to 1:1.5; and an organic solvent for said copolymer.

2. A coating composition comprising as an essential film-forming material a copolymer consisting of the copolymerization product of a secondary alklyl acid ester of maleic acid, wherein the alkyl group contains from 6 to 10 carbon atoms, with styrene said alkyl acid ester and styrene being copolymerized in a molal ratio of about 1:1.1 to 1:1.5; and an organic solvent for said copolymer.

3. A coating composition comprising as an essential film-forming material a copolymer consisting of the copolymerization product of methyl isobutyl carbinyl acid amelate with styrene, said maleate and styrene being copolymerized in a molal ratio of about 1:1.1 to 1:1.5; and an organic solvent for said copolymer.

4. A coating composition comprising as an essential film-forming material a copolymer consisting of the copolymerization product of methyl amyl carbinyl acid maleate wtih styrene, said maleate and styrene being copolymerized in a molal ratio of about 1:1.1 to 1:1.5; and an organic solvent for said copolymer.

5. A coating composition comprising as an essential film-forming material a copolymer consisting of the copolymerization product of methyl hexyl carbinyl acid maleate with styrene, said maleate and styrene being copolymerized in a molal ratio of about 1:1.1 to 1:1.5; and an organic solvent for said copolymer.

6. A coating composition comprising from about 8 to 28% by weight of a copolymer consisting of the copolymerization product of a secondary alkyl acid maleate, wherein the alkyl group contains from 6 to 10 carbon atoms, and styrene, said maleate and styrene being copolymerized in a molal ratio of about 1:1.1 to 1:1.5; from about 5 to 75% by weight, based on said copolymer, of a film-forming material compatible therewith; from about 5 to 60% by weight, based on said copolymer, of a plasticizer for said copolymer, and said film-forming material; and an organic solvent for the foregoing ingredients.

7. A coating composition comprising from about 8 to 28% by weight of a copolymer consisting of the copolymerization product of a secondary alkyl acid maleate, wherein the alkyl group contains from 6 to 10 carbon atoms, and styrene, said maleate and styrene being copolymerized in a molal ratio of about 1:1.1 to 1:1.5; from about 5 to 75% by weight, based on said copolymer, of nitrocellulose; from about 5 to 60% by weight, based on said copolymer, of a plasticizer for said copolymer and said nitrocellulose; and an organic solvent for the foregoing ingredients.

8. A coating composition comprising from about 8 to 28% by weight of a copolymer consisting of the copolymerization product of a secondary alkyl acid maleate, wherein the alkyl group contains from 6 to 10 carbon atoms, and styrene, said maleate and styrene being copolymerized in a molal ratio of about 1:1.1 to 1:1.5; from about 5 to 75% by weight, based on said copolymer, of ethyl cellulose; from about 5 to 60% by weight, based on said copolymer, of a plasticizer for said copolymer and said ethyl cellulose; and an organic solvent for the foregoing ingredients.

9. A coating composition comprising from about 8 to 28% by weight of a copolymer consisting of the copolymerization product of a secondary alkyl acid maleate, wherein the alkyl group contains from 6 to 10 carbon atoms, and styrene, said maleate and styrene being copolymerized in a molal ratio of about 1:1.1 to 1:1.5; from about 5 to 75% by weight, based on said copolymer, of an alcohol-soluble natural resin; from about 5 to 60% by weight, based on said copolymer, of a plasticizer for said copolymer and said natural resin; and an organic solvent for the foregoing ingredients.

10. A coating composition comprising from about 8 to 28% by weight of a copolymer consisting of the copolymerization product of methyl isobutyl carbinyl acid maleate and styrene, said maleate and styrene being copolymerized in a molal ratio of about 1:1.1 to 1:1.5; from about 5 to 75% by weight, based on said copolymer, of nitrocellulose; from about 5 to 60% by weight, based on said copolymer of a plasticizer for said copolymer and said nitrocellulose; and an organic solvent for the foregoing ingredients.

11. A coating composition comprising from about 8 to 28% by weight of a copolymer consisting of the copolymerization product of methyl hexyl carbinyl acid maleate and styrene, said maleate and styrene being copolymerized in a molal ratio of about 1:1.1 to 1:1.5; from about 5 to 75% by weight, based on said copolymer, of nitrocellulose; from about 5 to 60% by weight, based on said copolymer of a plasticizer for said copolymer and said nitrocellulose; and an organic solvent for the foregoing ingredients.

12. A coating composition comprising from about 8 to 28% by weight of a copolymer consisting of the copolymerization product of methyl amyl carbinyl acid maleate and styrene, said maleate and styrene being copolymerized in a molal ratio of about 1:1.1 to 1:1.5; from about 5 to 75% by weight, based on said copolymer, of nitrocellulose; from about 5 to 60% by weight, based on said copolymer, of a plasticizer for said copolymer and said nitrocellulose; and an organic solvent for the foregoing ingredients.

13. A coating composition comprising as an essential film-forming material a copolymer consisting of the copolymerization product of a secondary alkyl acid ester of an ethylene $\alpha,\beta$-dicarboxylic acid selected from the group consisting of maleic and fumaric acids, wherein the alkyl group contains from 4 to 12 carbon atoms, and a polymerizable vinyl compound having the general formula: $R—CH=CH_2$, where R is a radical selected from the group consisting of a phenyl group, a chloro substituted phenyl group and a methyl substituted phenyl group, said dicarboxylic compound and said vinyl compound being copolymerized in a molal ratio of about 1:1 to 1:2; and an organic solvent for said copolymer.

14. The process which comprises copolymerizing by heating in the presence of a catalyst from about 1 to 2 molecular proportions of a polymerizable vinyl compound having the general formula: $R—CH=CH_2$, where R is a radical selected from the group consisting of a phenyl group, a chloro substituted phenyl group and a methyl substituted phenyl group, together with 1 molecular proportion of a secondary alkyl acid ester of an ethylene $\alpha,\beta$-dicarboxylic acid selected from the group consisting of maleic and fumaric acids, wherein the alkyl group contains from 4 to 12 carbon atoms.

15. The process which comprises copolymerizing by heating in the presence of a catalyst from about 1 to 2 molecular proportions of a polymerizable vinyl compound having the general formula: $R—CH=CH_2$, where R is a radical selected from the group consisting of a phenyl group, a chloro substituted phenyl group and a methyl substituted phenyl group, together with 1 molecular proportion of a secondary alkyl acid ester of an ethylene $\alpha,\beta$ dicarboxylic acid selected from the group consisting of maleic and fumaric acids, wherein the alkyl group contains from 6 to 10 carbon atoms.

16. The process which comprises copolymerizing by heating in the presence of a catalyst from about 1.1 to 1.5 molecular proportions of styrene together with 1 molecular proportion of a secondary alkyl acid ester of an ethylene $\alpha,\beta$ dicarboxylic acid selected from the group consisting of maleic and fumaric acids, wherein the alkyl group contains from 6 to 10 carbon atoms.

17. The process which comprises copolymerizing by heating in the presence of a catalyst from about 1 to 2 molecular proportions of styrene together with 1 molecular proportion of a secondary alkyl acid ester of maleic acid, wherein the alkyl group contains from 4 to 12 carbon atoms.

18. The process according to claim 17, but further characterized in that the secondary alkyl acid ester is secondary butyl acid maleate.

19. The process according to claim 17, but further characterized in that the secondary alkyl acid ester is methyl isobutyl carbinyl acid maleate.

20. The process according to claim 17, but further characterized in that the secondary alkyl acid ester is methyl hexyl carbinyl acid maleate.

21. The process according to claim 17, but further characterized in that the secondary alkyl acid ester is methyl amyl carbinyl acid maleate.

22. A copolymer consisting essentially of the copolymerization product of a polymerizable vinyl compound having the general formula: $R—CH=CH_2$, where R is a radical selected from the group consisting of a phenyl group, a chloro substituted phenyl group and a methyl substituted phenyl group, and a secondary alkyl acid ester of an ethylene $\alpha,\beta$ dicarboxylic acid selected from the group consisting of maleic and fumaric acids, wherein the alkyl group contains from 4 to 12 carbon atoms, said vinyl compound and secondary alkyl acid ester being copolymerized in a molal ratio of about 1:1 to 2:1.

23. A copolymer consisting essentially of the copolymerization product of styrene and a secondary alkyl acid ester of maleic acid, wherein the alkyl group contains from 4 to 12 carbon atoms, said styrene and secondary alkyl acid ester being copolymerized in a molal ratio of about 1:1 to 2:1.

24. A copolymer consisting essentially of the copolymerization product of styrene and secondary butyl acid maleate, said styrene and maleate being copolymerized in a molal ratio of about 1:1 to 2:1.

25. A copolymer consisting essentially of the copolymerization product of styrene and methyl isobutyl carbinyl acid maleate, said styrene and maleate being copolymerized in a molal ratio of about 1:1 to 2:1.

26. A copolymer consisting essentially of the copolymerization product of styrene and methyl hexyl carbinyl acid maleate, said styrene and maleate being copolymerized in a molal ratio of about 1:1 to 2:1.

27. A copolymer consisting essentially of the copolymerization product of styrene and methyl amyl carbinyl acid maleate, said styrene and maleate being copolymerized in a molal ratio of about 1:1 to 2:1.

GERALD R. BARRETT.

REFERENCES CITED

The following references are of record in the file of this patent:

UNITED STATES PATENTS

| Number | Name | Date |
|---|---|---|
| 2,047,398 | Voss et al. | July 14, 1936 |
| 2,279,881 | D'Alelio | Apr. 14, 1942 |
| 2,426,902 | Seymour | Sept. 2, 1947 |

FOREIGN PATENTS

| Number | Country | Date |
|---|---|---|
| 466,898 | Great Britain | June 8, 1937 |